United States Patent
Kneipp et al.

(10) Patent No.: US 7,902,137 B2
(45) Date of Patent: Mar. 8, 2011

(54) BIODEGRADABLE SCALE CONTROL COMPOSITION FOR USE IN HIGHLY CONCENTRATED ALKALINE HARD SURFACE DETERGENTS

(75) Inventors: Ann Maria Kneipp, St. Louis, MO (US); Nancy-Hope Elizabeth Kaiser, Pontoon Beach, IL (US)

(73) Assignee: American Sterilizer Company, Mentor, OH (US)

( * ) Notice: Subject to any disclaimer, the term of this patent is extended or adjusted under 35 U.S.C. 154(b) by 0 days.

(21) Appl. No.: 12/455,076

(22) Filed: May 28, 2009

(65) Prior Publication Data

US 2009/0298738 A1 Dec. 3, 2009

Related U.S. Application Data

(60) Provisional application No. 61/130,466, filed on May 30, 2008.

(51) Int. Cl.
*C11D 1/08* (2006.01)

(52) U.S. Cl. ......... 510/247; 510/161; 510/245; 510/258; 510/264; 510/477; 510/480; 134/34; 134/36; 134/40; 134/41; 134/42

(58) Field of Classification Search ............ 510/247, 510/161, 245, 258, 264, 477, 480; 134/34, 134/36, 40, 41, 42
See application file for complete search history.

(56) References Cited

U.S. PATENT DOCUMENTS

| | | | |
|---|---|---|---|
| H468 H | 5/1988 | Malik et al. | |
| 4,935,065 A | 6/1990 | Bull | |
| 5,489,666 A | 2/1996 | Carey et al. | |
| 5,647,995 A | 7/1997 | Kneller et al. | |
| 5,767,056 A | 6/1998 | Lenoir | |
| 5,786,320 A | 7/1998 | Urfer et al. | |
| 6,274,541 B1 | 8/2001 | Man | |
| 6,479,453 B2 | 11/2002 | Man | |
| 6,537,960 B1 | 3/2003 | Ruhr et al. | |
| 6,541,442 B1 | 4/2003 | Johansson et al. | |
| 6,581,613 B2 | 6/2003 | Berkels et al. | |
| 6,632,291 B2 | 10/2003 | Rabon et al. | |

(Continued)

FOREIGN PATENT DOCUMENTS

WO  WO 95/15984  6/1995

(Continued)

OTHER PUBLICATIONS

Casiau. "Complexing Agents Between Science, Industry, Authorities and Users", Centro Stefano Fanscini Monte Vent. Ascona Switzerland [online], Mar. 11-16, 2007.

*Primary Examiner* — Harold Y Pyon
*Assistant Examiner* — Timothy Chiang
(74) *Attorney, Agent, or Firm* — Hudak, Shunk & Farine Co. LPA

(57) ABSTRACT

An alkaline concentrated detergent composition for use in cleaning hard surfaces, medical instruments and other metal components (parts, tools, utensils, vessels, equipment) having superior cleaning efficacy at much lower alkali content than traditional alkaline cleaners and enhanced scale control properties even when diluted to about 1/40 ounce per gallon to about 1/10 ounce per gallon in potable water and even in exceptionally hard water. The inventive composition maintains its superior cleaning efficacy and scale control properties during use.

4 Claims, 3 Drawing Sheets

U.S. PATENT DOCUMENTS

| | | |
|---|---|---|
| 6,686,325 B2 | 2/2004 | Clampitt |
| 6,750,188 B2 | 6/2004 | Baker et al. |
| 7,037,884 B2 | 5/2006 | Man |
| 2001/0014656 A1 | 8/2001 | Smith et al. |
| 2005/0247637 A1 | 11/2005 | Sher et al. |
| 2006/0154840 A1* | 7/2006 | Yagi et al. ............. 510/193 |
| 2008/0221006 A1* | 9/2008 | Heisig et al. ........... 510/272 |

FOREIGN PATENT DOCUMENTS

WO     WO 02/47819     6/2002

* cited by examiner

BIODEGRADABLE SCALE CONTROL COMPOSITION FOR USE IN HIGHLY CONCENTRATED ALKALINE HARD SURFACE DETERGENTS

CROSS REFERENCE

This application claims the benefit of priority under 35 U.S.C. §119 of U.S. Provisional Application Ser. No. 61/130,466 filed on May 30, 2008.

FIELD OF THE INVENTION

This invention relates to an ultra-concentrated alkaline detergent product comprising a synergistic scale control composition that combines biodegradable chelants and sequestrants to provide superior control of hard water scale formation at lower use-dilution strengths that conventional concentrated alkaline detergent compositions. More particularly, this invention is directed to a user-friendly, biodegradable, ultra-concentrated alkaline detergent composition(s) for use in cleaning medical instruments, utensils and other equipment, and hard surfaces, which achieve efficacious cleaning and possess advantageous scale inhibition, destaining and compatibility properties, over conventional alkaline cleaning compositions, even when diluted to a lower alkalinity content. Effective cleaning and advantageous properties are maintained upon dilution and while in use, even in exceptionally hard water.

BACKGROUND OF THE INVENTION

This invention is discussed with particular reference to, and primarily in terms of, its usefulness in manual or automated applications to clean medical instruments, utensils or other equipment; however, its uses are not limited to these applications. In particular, the inventive compositions may be used in cleaning medical instruments or equipment, such as surgical instruments (scalpels, biopsy instruments, clamps and the like), endoscopes, proctoscopes, laparoscopes, colonoscopes, and other equipment used for medical or surgical procedures and other metal equipment and surfaces in use in the practice of medicine and/or dentistry. In addition, this invention is also intended to include instruments, equipment, hard surfaces and the like in facilities that have similar cleaning requirements, such as, for example, pharmaceutical manufacturing facilities, dairy farms, water recycling equipment, food processing, restaurants, hair salons, cosmetic treatments, veterinary practices, and any other application where cleaning of human or animal blood, protein, lipid soils, or other similar soils are required, and where there is a particular need for scale control and compatibility with soft metals in an applied cleaning composition. The inventive compositions are also useful for their destaining characteristics.

Detergents, including concentrated formulations, for use in cleaning hard surfaces, medical instruments, utensils and other metal equipment (parts, tools, vessels, surfaces) are known in the art. While medical instruments and associated equipment often require sterilization, typically, such instruments and equipment are first cleaned and scrubbed to remove soils, including but not limited to blood, lipid and protein soils, with which they have been coated during use. Instruments/equipment cannot be sterilized while they are coated with these soils, since the soil may set as a hardened residue which is difficult to remove later. Soil also presents a barrier to sterilant penetration. Generally, instruments and equipment are either manually scrubbed (or rinsed) with, or soaked in, a detergent cleaning solution to remove the bulk of the soil from their surfaces or an automated washer may be utilized.

Alkaline cleaners are highly desirable because they promote saponification of fatty (oily) soils, which, in turn, facilitates the cleaning process. Highly alkaline cleaners are used for cleaning and sanitizing medical instruments, utensils and other equipment, hard surfaces, and manufacturing equipment, including Clean-in-Place (CIP) applications.

Alkaline cleaning compositions are well known in the art. By way of illustration only, U.S. Pat. No. 6,581,613 to Berkels et al. discloses a composition comprising 0.1-50% of a defined alkylpolyglucoside (D.P. 1.7 to 3 and an alkyl radical comprising 8 carbon atoms) and 50 to 99.9% of a concentrated alkali metal hydroxide solution, for use in breweries and dairies.

U.S. Pat. Nos. 6,274,541, 6,479,453 and 7,037,884 to Man disclose an alkaline cleaning composition comprising an alkyl or alkylaryl ethoxy carboxylate (0.1-20 wt. %), a strong chelating agent, such as NTA, EDTA, HEDTA, and DTPA, preferably EDTA (1-20 wt. %), and a source of alkalinity, preferably a combination of ammonia or ammonium hydroxide, monoethanolamine and sodium hydroxide (2-30 wt. %) stated to be especially effective for removing lime-soaps in greasy soils from hard quarry or ceramic tile.

U.S. Pat. No. 6,686,325 discloses an alkaline sensitive metal cleaning composition as a two part system, one portion being an alkaline concentrate comprising one chelant and the other portion being a corrosion inhibitor concentrate comprising a corrosion inhibitor, a second chelant, and a surfactant, combined with a threshold inhibitor/crystal modifier component to stabilize the corrosion inhibitor in a use solution comprising both portions.

H468 to Malik et al., a statutory invention record, discloses a process for cleaning a soiled hard surface by applying an alkaline cleaner comprising an alkalinity source 0.1-50 wt. % and an alkylglucoside (0.1 to 40 wt. %), which is stated to be superior to alkaline cleaning compositions comprising anionic and nonionic surfactants for hard surface cleaning. The formulation also contemplates the addition of phosphate builders and the use of water miscible solvents.

U.S. Pat. No. 6,541,442 to Johansson discloses an alkaline composition containing a high amount (up to 30 wt. %) of a nonionic alkylene oxide adduct surfactant and a hexyl glucoside as a hydrotrope, for use in cleaning hard surfaces, in a mercerization process, and to clean, desize and scour fibers and fabrics at a pH above 11. The composition also includes complexing agents, such as phosphates and NTA and EDTA.

U.S. Pat. No. 6,537,960 to Ruhr et al discloses a low-foaming surfactant blend for use in highly alkaline conditions comprising at least one $C_3$ to $C_{10}$ alkyl polyglucoside, at least one amine oxide, at least one polycarboxylated alcohol alkoxylate and at least one alcohol alkoxylate. The disclosed surfactant is stated to facilitate chlorine stability.

U.S. Pat. No. 6,581,613 discloses an alkylpolyglucoside with a high degree of oligomerization (1.7 to 3) in combination with 90 to 99.9% of a concentrated metal alkali.

U.S. Pat. No. 5,767,056 to Lenoir discloses an aqueous alkaline composition comprising an alkali metal hydroxide and an addition reaction product of an alcohol having 6-18 carbon atoms, with either propylene oxide and ethylene oxide or butylene oxide and ethylene oxide, for cleaning surfaces of fruits, vegetables, containers for food, or for chemical peeling of fruit or vegetables, metal working or cotton mercerization.

U.S. Pat. No. 4,935,065 discloses an aqueous alkaline cleaning concentrate/wash solution comprising sodium hydroxide, 2-phosphonobutane-1,2,4-tricarboxyclic acid, sodium polyacrylate, and sodium hypochlorite.

WO 02/47819 discloses an aqueous solution for carrying out the alkaline purification of synthetic resin ion exchangers comprising alkalinity contributors and sequestering agents in specific proportions.

Alkaline cleaning compositions of the prior art suffer from a number of disadvantages or drawbacks. While increased active alkali content is generally associated with improved cleaning performance, it also presents some safety hazards for workers, especially with very high alkali content. In addition, the use of highly alkaline compositions has been limited due to the instability of various components included in the compositions to enhance their properties. In particular, certain components, such as surfactants, hydrotropes, chelants, sequestrants, and other scale inhibition agents and the like, are difficult to incorporate into a highly alkaline, liquid composition, so that the final product is stable in storage for a reasonable shelf life. Highly alkaline cleaners also present compatibility problems with soft metals, such as the type used in medical instruments, utensils and other metal components and in equipment, such as automated washers and other disinfectors. While dilution of conventional concentrated cleaners to achieve a lower alkali content and improved compatibility is often recommended, dilution often results in less than optimal cleaning performance. As a result, an optimal cleaning composition, comprising components necessary to remove hard-to-clean soils effectively has been difficult to achieve.

There are other drawbacks to the use of current, commercially available alkaline cleaning products. Many detergent systems employ the use of chelating agents, such as tetrasodium ethylenediaminetetraacetate (EDTA) or nitrilotri-acetate (NTA), that are not considered totally biodegradable. NTA has also been classified as a possible carcinogen to humans (Group 2B) by the Insecticide Restrictions Action Committee (IRAC)'s working group. Further, certain components cannot be used in certain geographic areas, such as for example Europe, due to regulatory restrictions. Thus, achieving cleaning efficacy using conventional liquid detergents required the use of components that are not environmentally friendly or safe.

In addition to the above noted problems, the required volumes of traditional alkaline cleaning compositions in an instrument processing department within a hospital, or other facility where such cleaning is necessary, are typically very large. In order to achieve high efficiency in processing medical instruments, utensils and other equipment in automated cleaners, the change out of empty containers to full containers needs to be held to a minimum. As a result, traditional cleaning products are often manufactured as, and sold to, hospitals or other facilities in containers from 5 to 55 gallons.

Conventional concentrated cleaning compositions also generally require a chelant concentration of 10% or greater in order to be effective when diluted. For example, traditional detergent concentrates typically are diluted to ⅛-2 oz./gal. (in water) prior to use, resulting in a concentration of 195 ppm to 781 ppm of active chelant/inhibitor in the wash solution. This level of dilution necessitates the use of large volumes of cleaners (and hence containers) as well. The weight and bulk of containers pose an ergonomic risk to workers handling the containers, and the size of the containers occupies valuable space. It would be desirable, therefore, to achieve effective cleaning, scale control, destaining and compatibility properties using lower volumes of detergents/cleaners to minimize cost and space, while achieving the same or better results than prior art compositions, with the added advantage of being user and environmentally friendly.

Currently available cleaning products attempt to address the ergonomic and storage space issues associated with bulk cleaning products. In particular, cleaning compositions have been provided as solid bricks or blocks, or other solid forms, which must be diluted with water prior to introduction to the washing or cleaning process. An example of such a product is manufactured by Ecolab and disclosed in U.S. Pat. Nos. 5,786,320 and 6,632,291 B2. Two "bricks" of the solid formulations purportedly are equivalent to 15 gallons of comparable cleaning products. Despite some improvement in ergonomics, these solid products do not sufficiently protect medical (or other metal) instruments or automated instrument washers from corrosion caused by water and/or contaminants within the water. Notably, they do not contain sufficient amounts or types of components to prevent the formation of water hardness deposits or scale that result from using hard water (i.e., >about 100 ppm as $CaCO_3$), on medical instruments or other metal parts or equipment, or in automated washers. In short, even currently available products designed to address ergonomic considerations cannot provide adequate chelation or scale inhibition in hard water applications.

An ideal liquid detergent composition should provide efficacious cleaning at low use dilutions, i.e., require less volume to clean effectively. A cleaning concentrate that requires less volume to achieve the same or better cleaning efficacy and provides effective scale control properties at low use dilutions is desirable from not only an ergonomic perspective but also costs. Using less of a cleaning concentrate to achieve efficient, effective cleaning and scale inhibition allows for smaller containers, less storage space, and reduces the cost of materials for each cleaning process.

As discussed above, conventional cleaning compositions achieve scale control through the use of highly alkaline (or acid) cleaners combined with chelants, sequestrants or other scale inhibitors that are not biodegradable. In addition, depending on water hardness in a particular geographic region, achieving scale inhibition using dilute solutions of concentrated cleaners and then maintaining scale inhibition throughout the cleaning process has been difficult to achieve. Typically, scale control in traditional cleaning concentrates has been and is being achieved by using a chelant for scale inhibition, such as EDTA (ethylene diamine tetra-acetic acid), NTA (nitrilotriacetic acid), and phosphonates, which inhibits calcium and magnesium scale deposits, by chemically binding to calcium or magnesium cations, usually in a one-to-one molar ratio, to form a complex, i.e., a chelate. Drew Chemical Corp., *Principles of Industrial Water Treatment.*, 1984, pp. 80-84. In short, one molecule of the chelant combines with one or more ions of calcium, or another metal, to form a new complex. This complex prevents the calcium or magnesium cations from interacting with carbonate anions, thus preventing scale formation. Chelants also prevent metals, such as zinc, copper or iron, from depositing on an instrument or washer surface where they could cause staining or corrosion. Scale inhibitors, such as phosphates, can also be used to inhibit the crystal structure of calcium carbonate, thus preventing calcium carbonate salts from aggregating into particles large enough to precipitate.

Sequestrants also are used to control scale formation. Sequestrants work in a different manner. One sequestrant molecule may interact with many metal ions and salts. Sequestrants do not prevent the formation of calcium or magnesium carbonate. Rather, they interact with the small calcium and magnesium carbonate particles preventing them from aggregating into a hard scale deposit. The particles repel each other and remain suspended in the water, or form loose aggregates which may settle. These loose aggregates are easily rinsed away and do not form a deposit.

In addition to the specific chelants described above, other compositions have also been used to control calcium carbonate scale and steel corrosion. One example is U.S. Pat. No. 5,647,995, which discloses a method to control scale and corrosion in cooling water using an alkali metal diphosphinate salt that is formed by reacting an acetylenic compound with an alkali metal hypophosphite in the presence of a free radical source. The diphosphinate salt is further reacted to prepare diphosphonate compounds and diphosphinate containing adducts, oligomers, and polymers having control scale and corrosion inhibiting properties.

Another example is U.S. Pat. No. 5,489,666 which discloses a composition for inhibiting the formation and deposition of calcium scales in a circulating aqueous system, such as a cooling water system. The composition used to treat the water is a modified poly-epoxysuccinic acid, which is stated to be effective at conditions of high pH, high calcium concentration and high M-alkalinity, where conventional treatments lose efficacy.

U.S. 2005/0247637 A1 discloses a water treatment for scale control in hard water, which can be used in boilers, or other heating units, hot pipes for commercial, industrial and domestic uses, particularly for drinking water treatment, food service vending and dispensing machines with internal mixing surfaces, boiler or on demand heating elements and similar components. The treatment comprises the combination of metal particulates, e.g., zinc and copper, along with polyphosphates, which is stated to drastically reduce the scale deposition on internal surfaces of high cycle food or beverage dispensing systems with a synergistic effect compared to use of the components alone.

EP 0733073 (WO 95/15984) discloses a carboxymethyl inulin having degrees of substitution (D.S.) ranging from 0.15 to 2.5, which is stated to be useful as an inhibitor of the crystallization of calcium carbonate and is biodegradable. No specific cleaning formulations are disclosed.

Many of the traditional chelants, sequestrants and other scale control agents, including several discussed above, have been the subject of increased regulatory scrutiny due to their impact on the environment. As regulations, both international and domestic, become more stringent, the need to replace phosphorous containing chemistries is necessary. Hence, consumer preference and demand for phosphate-free chemistries is expected to increase.

Based on the foregoing, currently available concentrated alkaline cleaners present many disadvantages in their use. Many contain components that are not biodegradable or user or environmentally friendly, but are subject to strict environmental scrutiny, and thus present health and safety concerns for workers. Highly alkaline cleaners that require large volumes in use also present safety hazards for workers. Large volumes are often required to be on site and for efficiency in operations, large containers are often used for detergent supply. These large containers occupy valuable space and present ergonomic risks due to the bulk and weight of the product containers. None of the conventional alkaline cleaners achieves scale control/inhibition at lower use concentrations nor do they maintain scale inhibition throughout the cleaning process. Many of the conventional alkaline cleaners are also incompatible with soft metals at the required use concentrations.

A new, ultra-concentrated alkaline detergent composition comprising a synergistic combination of scale control components (chelants, sequestrants), has been discovered, which surprisingly combines the properties of effective soil removal, biodegradability, and scale control in one concentrated formulation. The composition provides effective scale control when used in much lower concentrations, i.e., ranging from 1/40 oz./gal. to 1/10 oz./gal., than concentrations required by traditional cleaners. The inventive compositions are also physically stable, which allows for storage of smaller volume containers.

A primary advantage of the inventive composition is the reduction in costs of processing and ergonomic risk and storage space due to its highly concentrated nature and the low use dilutions required. Even at use dilutions of 1/10 to 1/40 the amount of traditional cleaners, the inventive composition(s) provides efficacious cleaning, while controlling water hardness at least as well as that achieved with traditional chemistries and even in exceptionally hard water.

Finally, another advantage of the inventive compositions is that they provide an alternative to the use of high volumes associated with traditional alkaline cleaners and are a viable option for consumers who prefer or require alkaline cleaning chemistries without the disadvantages associated with traditional products.

Generally, the concentrated alkaline biodegradable cleaner of the invention comprises the following components:
 a) two or more chelants and scale inhibitors;
 b) a hydrotrope;
 c) a source of alkalinity; and
 d) water.

Other components may be added as well, however, effective cleaning can be achieved without the need for additional detergents or surfactants, and unexpected compatibility with soft metals is achieved even without the addition of corrosion inhibitors.

It is an object of this invention to provide an ultra-concentrated, alkaline cleaning composition for use in cleaning medical instruments, utensils and other equipment and hard surfaces, which has superior cleaning efficacy at lower alkalinity levels and avoids the above discussed disadvantages of the conventional compositions, thus providing a commercial, cost effective alternative to conventional alkaline cleaning compositions.

It is a further object of this invention to provide a phosphate-free, ultra-concentrated, alkaline cleaning composition having lower alkalinity content that is safer to handle and use and is environmentally friendly.

Yet a further object of this invention is to provide, in an ultra-concentrated, alkaline cleaning composition, which maintains its desired property of scale control inhibition even as the concentrated cleaning composition is diluted and used.

A further object of this invention is to provide an ultra-concentrated, alkaline cleaning composition, which requires less of the concentrate to be diluted to achieve the above advantages thus reducing costs.

A further object of this invention is to provide an ultra-concentrated alkaline cleaning composition, which requires less of the concentrate to achieve the same effectiveness as traditional cleaners, thus reducing the need for large volume containers to store the cleaning composition supply and the space needed to store the supply of cleaning concentrate.

SUMMARY OF THE INVENTION

The novel ultra-concentrated, alkaline cleaning composition of the invention comprises an alkalinity source in combination with a hydrotrope and a synergistic scale inhibition system, for cleaning medical instruments, utensils and other equipment and hard surfaces. The inventive compositions contain chelants and other scale inhibition components that are environmentally friendly, i.e., biodegradable. "Biodegradable" means, but is not limited to, a structural change (transformation) of a component by micro-organisms resulting in the loss of its properties due to the degradation of the parent substance and consequential loss of its properties.

The inventive compositions are also safer to handle from a safety and ergonomic viewpoint and are more economical. In particular, superior scale inhibition is achieved even when the compositions are used at dilution strengths well below that used for conventional, traditional cleaning compositions, and scale inhibition is maintained throughout the cleaning process. Alkalinity levels are also lower than traditional cleaners. Thus, the lower amount of the inventive concentrate necessary to achieve cleaning and scale inhibition also provides an extremely cost effective alternative. In addition, because the ultra-concentrated alkaline compositions perform remarkably and unexpectedly well at much lower use-dilutions than traditional concentrated cleaners, smaller containers, less storage space, and lower volumes are needed, thus reducing ergonomic risks and increasing safety for the workers.

Generally, the inventive cleaning concentrate is an alkaline composition comprising a synergistic combination of components, such as:
 a) at least two scale inhibitor components;
 b) a hydrotrope;
 c) an alkalinity source; and
 d) water.

The source of alkalinity is preferably sodium hydroxide (available as 50% active), which is an EPA-approved "active" ingredient, which means it is recognized as effective for use as an antimicrobial. Potassium hydroxide (46% active) can also be used as a source of alkalinity in place of sodium hydroxide, or in combination with it. Potassium hydroxide is not recognized by the EPA as an "active" ingredient. In one preferred embodiment, both potassium hydroxide and sodium hydroxide are combined as the source of alkalinity. The alkaline component not only has effective cleaning properties, especially with oily soils, but it also maintains the pH above 10 throughout the cleaning process, which allows for optimal performance of scale inhibiting components.

The hydrotrope is utilized to stabilize the combination of components in order to allow them to remain soluble in the aqueous, alkaline composition. The hydrotrope is preferably and alkylglucoside or alkyl polyglucoside.

An important aspect of the invention is the utilization of a synergistic system of chlelants and scale inhibition components that are biodegradable. Chelation and scale inhibition have a positive impact on cleaning performance of the compositions. Preferably, the chelating agent is trisodium methylglycine diacetic acid (MGDA), also known commercially as Trilon M, although other biodegradable chelating agents known in the art may be used. In a preferred embodiment, at least two chelants, sequestrants, or other scale inhibition components are combined to produce unexpectedly superior scale inhibition at low use dilutions, which is maintained throughout the cleaning process.

It is important that all components be stable in alkaline conditions, meaning that none of the components appreciably degrade over the expected storage time of the ultra-concentrated, alkaline cleaning composition.

Although not required to achieve the advantageous properties described above, adjuvants may be added, such as coupling agents, buffers, dyes, perfumes, disinfecting agents (peroxides, phenols, quaternary amines, etc.), corrosion inhibitors, surfactants, or proteolytic or other enzymes without affecting the advantageous properties achieved.

BRIEF DESCRIPTION OF THE DRAWING

The invention will be better understood and other features and advantages will become apparent by reading the detailed description of the invention, taken together with the drawings, wherein.

DETAILED DESCRIPTION OF THE INVENTION

Figure 1:
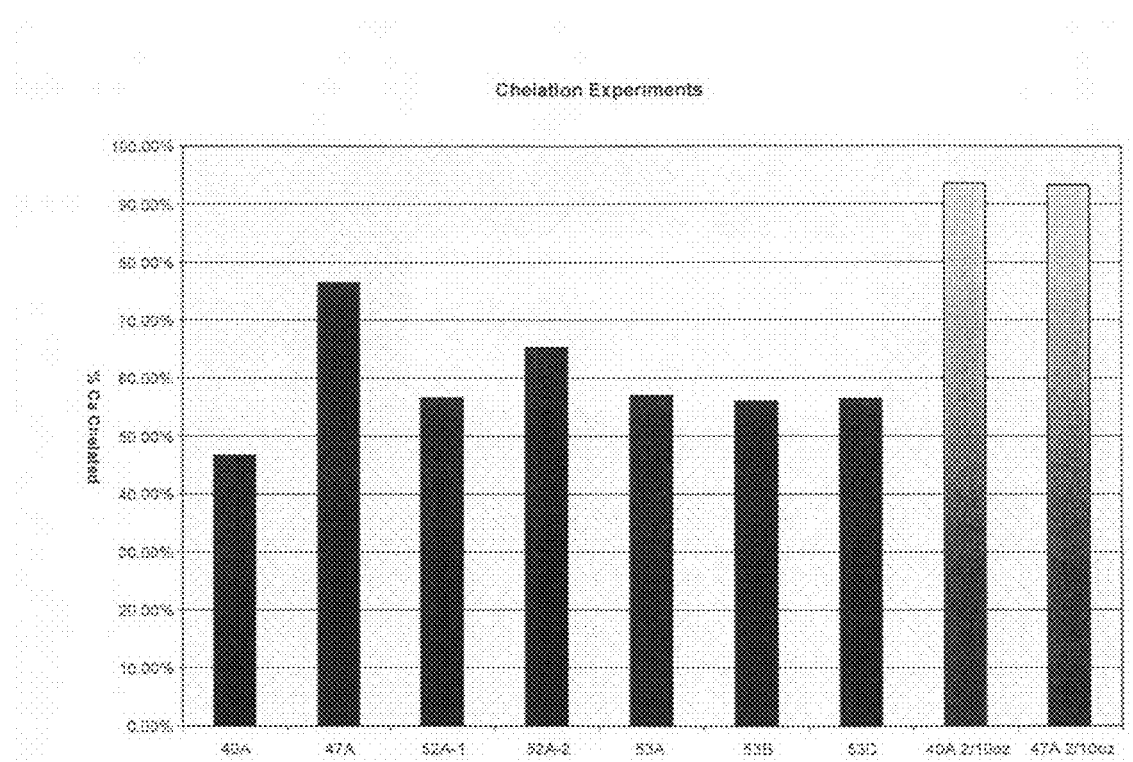
FIG. 1 shows the results of chelation experiments using varying levels of chelant/sequestrant components as reflected in Table II and use-dilutions of 1/10 and 1/40 oz/gallon and 2/10 oz/gallon (two formulations).

The invention is described with reference to the primary property of scale control. The invention is an ultra-concentrated, alkaline cleaning composition comprising at least two scale control components (chelants, sequestrants or other inhibitors) in an aqueous base having an alkaline pH. The preferred pH of the concentrate is >13.0. In one preferred embodiment, the inventive composition comprises multiple scale control components that include both chelants and sequestrants. The inventive formulations are phosphate-free and have a lower alkalinity content than traditional alkaline cleaners and, thus, are user and environmentally friendly. The components also appear to act synergistically to achieve superior cleaning performance and unexpected scale inhibition, which is achieved and maintained using lower dilutions than that used for previously known cleaning compositions, even in exceptionally hard water.

As used herein, "hard" water means greater than about 120 ppm of CaCO3, and "exceptionally hard" water means greater than about 300 ppm of CaCO3. As used herein, "ultra-concentrated" means formulations that effectively inhibit scale formation at use dilutions of 1/10 oz./gal. to 1/40 oz./gal. (of the ultra-concentrated detergent formulation in water), as compared to the 1/8 oz./gal. to 2 oz./gal. use-dilutions of conventional cleaners.

Accordingly, a unique feature of the inventive formulations is that they demonstrate remarkable and unexpected cleaning efficacy at much lower alkalinity than conventional cleaners and achieve their advantageous properties at lower use-dilutions than conventional cleaning concentrates. The inventive compositions surprisingly maintain their efficacy and advantageous properties through the cleaning process, even when encountering exceptionally hard water. They are also able to control scale formation even in use dilutions at 1/10 to 1/40 the amounts of traditional cleaners that are normally used for medical equipment cleaning. The preferred diluted composition results in active concentrations of chelant/inhibitor ranging from 28 to 58 ppm for a use dilution of about 1/40 oz./gal. to 225 to 275 ppm for use dilutions of about 1/10 oz./gal.

The hydrotrope is an important aspect of the inventive compositions and is essential to maintaining the stability of the entire formulation over the expected shelf life of the composition.

Scale Control

Scaling is a result of water hardness. Scale is a hard, adherent mineral composition, such as calcium or magnesium, which usually exists in a crystalline form. Scale deposition is a process which occurs when temperature, pH, concentration, flow rate, pressure or other water conditions are changed. Water contains a large number of potential scale-causing constituents, such as calcium and magnesium ions, silica compounds, iron, and other minerals.

Preferably, the inventive combinations achieve scale control by the use of two separate, synergistic components—chelants and sequestrants. While either chelant or sequestrant chemistry can achieve scale control independently, unexpected synergistic results have been achieved with the unique combination of components utilized in the invention, and thus a combination of at least two chelants and sequestrants is preferred.

Chelants work by combining with metals including calcium and magnesium to form a complex known as a chelant, which keeps the calcium or magnesium cations from interacting with the carbonate anions, thus preventing scale formation. They also prevent metals such as zinc, copper or iron from depositing on an instrument or washer surface where they could cause staining or corrosion. On the other hand, sequestrants work in a different manner. Sequestrants do not prevent the formation of calcium or magnesium carbonate. Rather, they interact with small calcium and magnesium carbonate particles preventing them from aggregating into a hard scale deposit. The particles repel each other and remain suspended in the water, or form loose aggregates which may settle. These loose aggregates are easily rinsed away and will not form a deposit.

Hence, a key aspect of the scale control property of the inventive compositions is attributable, generally, to the use of two different types of chemistries included in the detergent compositions. While these two chemistries (chelant and sequestrant) can achieve scale control independent of the other, it has been found that there is a synergistic effect between them that allows unexpected scale control in tap (potable) water, and even in exceptionally hard water, at very low use dilutions (1/40-1/10 oz./gal.).

The chemistries for scale control are relatively new on the market and a r e biodegradable. Useful sequestrants for the inventive compositions may include sodium polyaspartate (Baypure DS 100); sodium carboxymethyl inulin with carboxylate substitution degrees (DS) of 2.5 (Dequest SPE 15625); aminotri-methylene phosphonate (Dequest 2006); polyacrylic acid; and GLDA (glutamic acid, N,N-diacetic acid. tetrasodium salt (Dissolvine GL45-S). A preferred sequestrant is sodium carboxymethyl inulin (DS 2.5). Still other preferred sequestrants include aminotrimethylene phosphonate and polyacrylic acid. Preferably, combinations of preferred sequestrants are used.

Chelants are also used for scale control. The chelants selected for use in the claimed invention may include methyl glycine diacetic acid (MGDA, available as Trilon M), sodium glucoheptonate (Burco BSGH400), disodium hydroxymethyl-iminodiacetic acid (XUS 40855.01), imino disuccinic acid (Baypure CX 100/34 or Baypure CX 100 Solid G), EDDS ([S,S]-ethylenediamine-N,N'-disuccinic acid) (Octaquest A65 or Octaquest E30), citric acid, glycolic acid and-lactic acid. A preferred chelant is imino disuccinic acid tetrasodium salt. Another preferred chelant is methyl glycine diacetic acid trisodium salt.

Chelants/sequestrants are present in the inventive formulation(s) in amounts ranging from about 10 to about 50 wt. %, more preferably from about 20 to about 50 wt. %, and most preferably from about 30 to about 50 wt. %, based upon the total weight of the concentrate. More than one chelant/sequestrant may be used, indeed is preferred, and the ranges describe the total amount of chelants/sequestrants in the inventive formulation. In one preferred embodiment, at least three chelant/sequestrant components are utilized to achieve unexpected scale inhibition.

Alkalinity Source

The most preferred alkalinity system is sodium and potassium hydroxide, combined, although appropriate concentrations of either sodium hydroxide or potassium hydride may also be used. It has been found that the sodium/potassium hydroxide combination maintains the pH of the cleaning composition above 10, even while in use, which is the optimum performance range for chelants and scale inhibitors. Additional alkalinity sources include ethanolamine or triethanolamine (TEA), but these sources are less preferred.

Alkalinity sources are present in the inventive formulations in amounts ranging from about 3 to about 15%, based upon the total active alkali content in the concentrate. In a preferred embodiment, both sodium and potassium hydroxides are used as alkalinity sources.

Hydrotropes

Hydrotropes useful in the inventive compositions include, preferably, an alkylglucoside or a polyalkylglucoside. Other useful hydrotropes include sodium xylene sulfonate and octyldimethylamine oxide. Other useful hydrotropes are well known in the art.

Hydrotropes are present in the inventive formulation(s) in amounts ranging from about 2 to about 50 wt. %, more preferably from about 2 to about 20 wt. %, and most preferably from about 4 to about 10 wt. %, based upon the total weight of the concentrate. More than one hydrotrope may be used, and the ranges describe the total amount of hydrotropes in the inventive formulation.

The balance of the inventive composition is water.

As stated above, the inventive composition has an alkaline pH (>10) in concentrate and dilute form. Preferably, the pH of the concentrate is >13.0.

A preferred embodiment comprises at least three scale inhibition components, an alkylglucoside as a hydrotrope, an alkalinity source, and water. A particularly preferred embodiment comprises an alkylglucoside, polyacrylic acid, aminotrimethylene phosphonate, MGDA, sodium and potassium hydroxides and water.

The inventive formulations are prepared using traditional manufacturing techniques. The addition of the alkalinity source to an initial water charge is preferred, prior to adding scale inhibition components or a hydrotrope. The amount of water in the manufacturing vessel prior to addition of solid scale inhibition components is important to the process and must be sufficient to assure complete dissolution of the added materials. A hydrotrope may be added with the scale inhibition components or immediately thereafter.

The inventive detergent compositions are economical in that they are able to control scale formation in even exceptionally hard water at use dilutions of 1/40 oz. per gallon up to 1/10 oz. per gallon.

The detergent compositions of the invention are phosphate and EDTA-free, and thus more friendly to the environment. The components are also biodegradable which also minimizes the effects on the environment.

The highly concentrated compositions of the invention are physically stable and have a long shelf life. In addition, by concentrating the components and the lower use dilution, the traditional fifteen gallon container used for detergent supply may be replaced by a smaller (1.5 gallon) container and the costs of processing are also reduced.

EXAMPLES

The examples below illustrate several embodiments of the inventive compositions and the advantages achieved. The invention is not intended to be limited by the examples, and it is to be appreciated that one skilled in the art would understand that a variety of compositions can be prepared, by following the teachings herein, which would achieve the same results.

Example 1

Combinations of various chelants and sequestrants were evaluated. Table I sets forth the combinations tested. The combinations were each incorporated into a standard alkaline base that included an alkaline source, a surfactant system, corrosion inhibitors, and water. Test results provided information as to which combinations were most effective in preventing scale formation. The most efficacious combinations were A, B, C, D, F, I and L. These combinations were further modified and re-evaluated as set forth herein.

TABLE I

| Chelant Sequestrant Combinations | | | | | | | | | | | | |
|---|---|---|---|---|---|---|---|---|---|---|---|---|
| | A | B | C | D | E | F | G | H | I | J | K | L |
| Chelants | | | | | | | | | | | | |
| Aminotrimethylene phosphonate @ 20% | x | x | x | | | | | | | | | |
| Imino disuccinic acid @ 15% | | | | | x | x | x | | | | | |
| Methyl glycine diacetic acid @ 15% | | | | | | | | x | x | x | | |
| [S,S]-ethylenediamine-N,N'-disuccinic acid @ 20% | | | | | | | | | | | x | x | x |
| Sequestrants | | | | | | | | | | | | |
| Carboxymethyl inulin @ 5% | x | | | x | | x | | x | | x | | |
| Sodium Polyaspartate @ 5% | | x | | x | | x | | x | | x | | |
| Polyacrylic Acid @ 8% | | | x | | x | | x | | x | | x | |

Example 2

Experiments were conducted to determine scale inhibition/control properties of various inventive formulations. Table II, below, lists the components, and weight % for each component for the inventive formulations tested.

TABLE II

| Components wt % | 40A | 47A | 52A-1 | 52A-2 | 53A | 53B | 53C |
|---|---|---|---|---|---|---|---|
| MGDA | 29.10% | 23.30% | 26.75% | 26.75% | 26.75% | 26.75% | 26.75% |
| Polyacrylic Acid | 6.25% | 10.34% | 8.33% | 8.33% | 8.33% | 8.33% | 8.33% |
| Aminotrimethylene Phosphonate | | 10.42% | | | | | x |
| Sodium Hydroxide | 15.00% | 15.00% | 15.00% | 15.00% | 7.00% | 15.00% | 22.42% |

The chelant/sequestrant combinations above were prepared in alkaline solution and evaluated for their combined efficacy in exceptionally hard water (i.e., >about 300 ppm as CaCO3. All of the formulations contained an alkylglucoside as a hydrotrope, and the balance was water.

All of the formulations were tested at 1/10 and 1/40 oz/gallon use-dilutions (in water). Two of the formulations (40A and 47 A) were also tested at 2/10 oz/gallon use-dilution. Results are set forth in FIG. 1, reflected as a percentage of calcium chelated.

Example 3

Additional experiments were conducted to determine scale inhibition/ control properties of various other inventive formulations. Table III, below, lists the components, and weight % for each component for the inventive formulations tested. The balance of all formulations is water. Each formulation was tested at 1/10 use-dilution and evaluated for their efficacy in exceptionally hard water. Although all of the formulations set forth in Table III exhibited some level of scale inhibition under the harsh (about 400 ppm CaCO3) water hardness conditions of the test, preferred efficacy was deemed to be at least about 70% of calcium chelated, which equates to handling exceptionally hard water.

TABLE III

| Component wt % | A | B | C | D | E | F | G | H | I | J |
|---|---|---|---|---|---|---|---|---|---|---|
| MGDA | 17.00 | 26.75 | 26.75 | 23.30 | 23.30 | 23.30 | 23.30 | 23.30 | 21.18 | 27.05 |
| Polyacrylic Acid | 10.00 | 8.33 | 10.42 | 10.42 | 10.42 | 10.42 | 10.42 | 10.42 | 14.58 | 8.33 |
| Aminotrimethylene phosphonate | | 8.62 | | | 10.34 | 10.34 | | | 12.07 | 12.07 |
| GLDA | | | 7.89 | 12.50 | | | | | | |
| EDDS | 20.00 | | | | | | | | | |
| Imino disuccinic acid | | | | | | | 7.14 | 7.14 | | |
| Sodium hydroxide | 15.00 | 12.00 | 10.00 | 10.00 | 15.00 | 15.00 | 15.00 | 15.00 | 13.00 | 14.00 |
| Potassium hydroxide | 7.00 | 7.00 | 7.00 | 7.00 | 7.00 | 7.00 | 7.00 | 7.00 | 7.00 | 7.00 |
| Alkyl glucoside | 5.00 | 4.00 | 6.00 | 5.00 | 6.00 | | 6.00 | | 5.00 | 6.00 |
| Octyldimethylamine oxide | | | | | | 6.00 | | 6.00 | | |
| Octyl betaine | 5.00 | | | | | | | | | |
| Sodium tolyltriazole | | 5.00 | | 2.50 | | | | | | |

Figure 2:
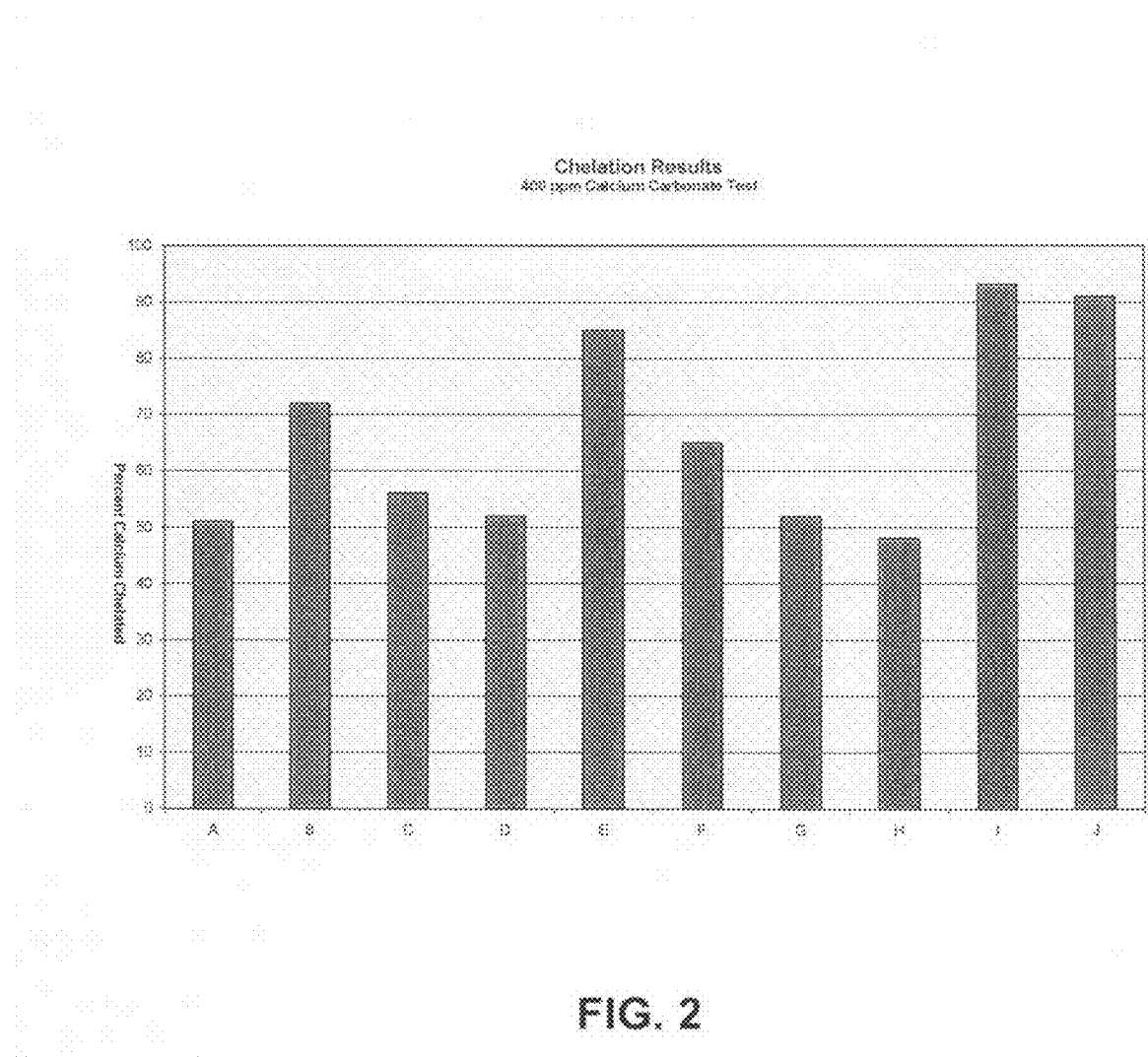
FIG. 2 shows the results of chelation experiments using various inventive formulations as reflected in Table III.

Test results provided information as to the combinations which were most effective in preventing scale formation, as reflected in FIG. 2 by the amount of calcium chelated. The higher the percentage of calcium chelated, the less scale formation.

Percentage calcium chelated was 51% (A), 72% (B), 56% (C), 52% (D), 85% (E), 65% (F), 52% (G), 48% (H), 93% (I) and 91% (J).

Example 4

Figure 3:
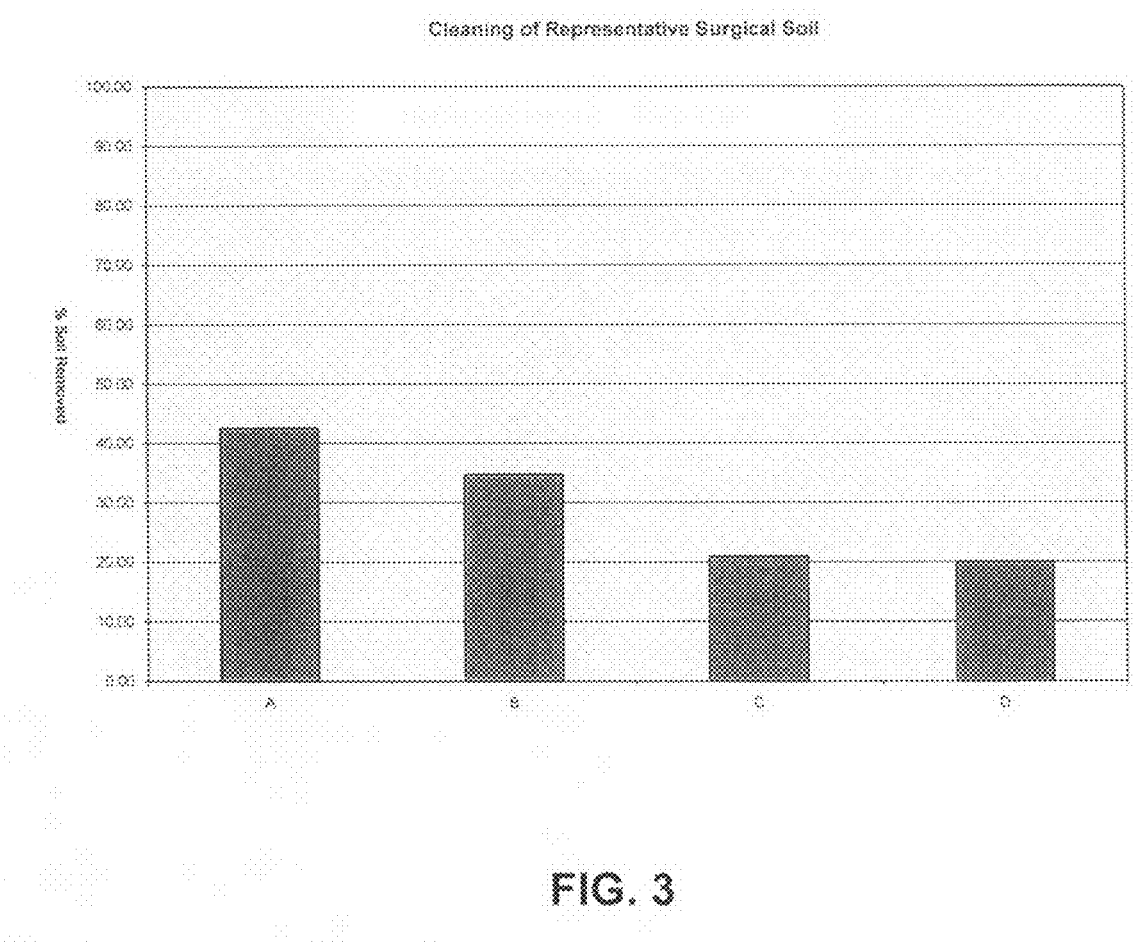
FIG. 3 shows the results of comparative cleaning experiments using the inventive formulations and traditional alkaline concentrate and solid cleaners.

Cleaning efficacy of an inventive composition (comprising an alkylglucoside as a hydrotrope, three scale inhibition components, an alkalinity source and water) was evaluated versus a traditional concentrate alkaline chemistry, a solid alkaline chemistry, and tap water alone. Performance of the new, ultra-concentrated alkaline detergent surpassed that of the other two detergent chemistries, as reflected in FIG. 3. This cleaning performance was deemed exceptional, given the significantly reduced level of alkalinity available in the use-dilution of the ultra-concentrated formulation versus the traditional ones, as shown in Table IV.

TABLE IV

| | Total in concentrate | Total in-use dilution |
|---|---|---|
| A - Ultra-Concentrated Alkaline Detergent 1/10 oz./gallon | 10.33% | 0.0081% |
| B - Traditional Alkaline Detergent 1 oz./gallon | 3.97% | 0.0310% |
| C - Solid Alkaline Detergent 1 oz/gallon (of a 4% pre-dilution | 0.06% | 0.06% |
| D - Tap Water alone | n/a | n/a |

It will be understood by those who practice the invention and those skilled in the art that various modifications and improvements may be made to the invention without departing from the spirit of the disclose concepts. The scope of protection afforded is to be determined by the claims and by the breadth of interpretation allowed by law.

What is claimed is:

1. A concentrated alkaline cleaning composition consisting of:
   (a) a biodegradable scale control system consisting of two components selected on the basis of two different mechanisms of action, one of which is a biodegradable sequestrant and the other of which is a biodegradable chelant, present in a combined amount of greater than about 25 wt. %, based upon the total weight of the concentrated composition;
   (b) a hydrotrope consisting of an alkyl glucoside, a polyalkylglucoside, sodium xylene sulfonate, octylbetaine, or octyl dimethylamine oxide;
   (c) sodium hydroxide or potassium hydroxide, or mixtures thereof, present in an amount greater than about 7% active alkali content;
   (d) a corrosion inhibitor; and
   (e) water,
   wherein the pH of the composition is greater than about 12 and maintains an alkaline pH throughout the cleaning process, and
   wherein the concentrated composition possesses and maintains scale control properties at low use-dilutions of 1/40 ounce up to no greater than 1/10 ounce per gallon of water.

2. The concentrated alkaline cleaning composition according to claim 1, wherein the biodegradable chelant consists of methyl glycine diacetic acid; sodium glucoheptonate; disodium hydroxyethyliminodiacetic acid; imino disuccinic acid; S,S-ethylenediamine-N,N'-disuccinic acid; or mixtures of two or more thereof.

3. The concentrated alkaline cleaning composition according to claim 1, wherein the biodegradable sequestrant consists of sodium polyaspartate, sodium carboxymethyl inulin, aminotrimethylene phosphonate, polyacrylic acid, and glutamic acid, N,N-diacetic acid tetrasodium salt, or mixtures of two or more thereof.

4. The concentrated alkaline cleaning composition according to claim 1, wherein the chelant is imino disuccinic acid and the sequestrant is sodium carboxymethyl inulin.

* * * * *